March 17, 1970 K. ARKLESS ET AL 3,501,262

OXIDATION PROCESS

Original Filed Feb. 5, 1963

INVENTORS
KENNETH ARKLESS and
DENNIS CLEAVER

BY Oscar L. Spencer
ATTORNEY

United States Patent Office 3,501,262
Patented Mar. 17, 1970

3,501,262
OXIDATION PROCESS
Kenneth Arkless, Eaglescliffe, and Dennis Cleaver, Saltburn, England, assignors to British Titan Products Company Limited, Durham, England, a corporation of the United Kingdom
Continuation of application Ser. No. 256,386, Feb. 5, 1963. This application Apr. 10, 1967, Ser. No. 629,820
Claims priority, application Great Britain, Feb. 6, 1962, 4,609/62
Int. Cl. C01g 57/00; C01f 7/00; C22b 59/00
U.S. Cl. 23—21                                    25 Claims

ABSTRACT OF THE DISCLOSURE

The vapor phase oxidation of a metal halide to form a normally solid particulate metal oxide is effected in a reaction zone containing gas heated by electrical discharge to a temperature of 2000° C.

RELATED APPLICATIONS

Figure 1:
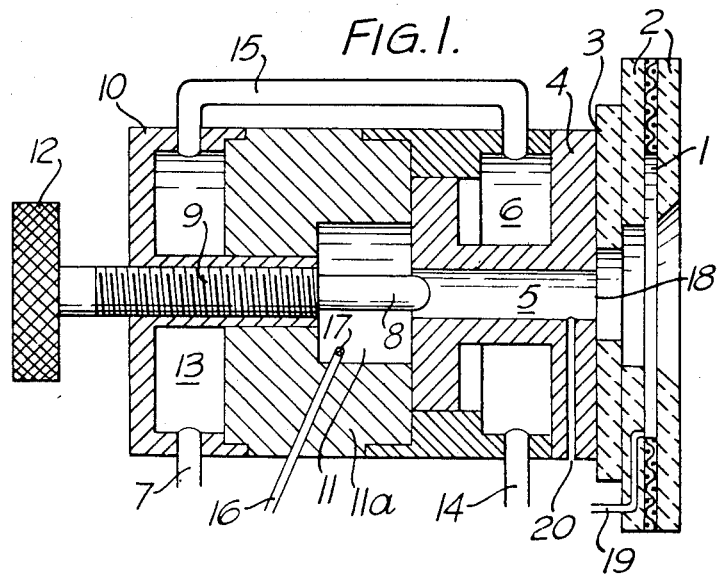

This application is a continuation of U.S. application Ser. No. 256,386, filed Feb. 5, 1963. Priority is claimed from British application No. 4,609/62, filed Feb. 6, 1962.

The present invention relates to an improved process for the production of metal or metalloid oxides.

Hereinafter, the term "metal" and "metalloid" shall be construed as synonyms; that is, "metal" shall be defined as including any element exhibiting metal-like properties such as the metalloids, for example, silicon.

The vapour phase oxidation of volatile metal or metalloid halides, for example titanium tetrachloride or silicon tetrachloride, with an oxygenating gas is known. The oxidation may take place in contact with the surface of finely-divided solids, for example in a fluidised bed as described in our British patent specification No. 761,770, relating to the oxidation of a titanium tetrahalide, or in our copending patent application No. 6,987/58, now British patent specification 907,211 relating to the oxidation of a silicon tetrahalide. Other methods for the vapour phase oxidation of such materials in contact with the surfaces of finely-divided solids are described in our British patent specification No. 860,301. In the case of an exothermic reaction, a large part of the heat of reaction is retained in the fluidised bed. This reduces, and sometimes may eliminate, the need to supply heat from an external source to maintain the reaction temperature.

In addition to the oxidation of metal or metalloid halides in the presence of surfaces of finely-divided solids, processes are also known in which the metal or metalloid halides are oxidised in the vapour phase in the absence of such surfaces. In these processes the reaction zone contains no finely-divided solid, such as in a fluidised bed, to conserve heat from the exothermic reaction, and the heat of reaction therefore passes from the reaction zone with the reaction products, unless special measures are taken to conserve such heat, for example by the process of our copending application No. 36,227/57, now British patent specification 907,211. It is otherwise necessary to supply heat to the reaction zone to maintain the reaction. Hitherto, this has been done by introducing the reactants into the reaction zone through a burner, through which is also introduced a fuel, for example a gaseous fuel such as carbon monoxide, which is burned in excess oxygenating gas to supply the necessary heat to maintain the reaction temperature. This has necessitated the provision of large burners of complicated design. The velocity of the reactants entering the reaction zone has been limited by the propagation characteristics of the flame of the burning fuel. Furthermore, the efficiency of utilisation of the heat produced by the burning fuel has been low, and large quantities of fuel have had to be introduced to maintain the reaction temperature.

In some cases the burning of the fuel may produce impurities which adversely affect the colour of the product. This is particularly undesirable when the product is to be used as pigment.

An alternative method of introducing heat into the reaction zone to maintain the reaction temperature has been to pre-heat the reactants to a high temperature, for example to temperatures in the range of 800° C. to 2000° C. Owing to the reactive nature of the compounds this is difficult and involves complex and expensive equipment. Where the heating is accomplished by burning a fuel in the gas, the velocity of the reactant flow is again limited by the propagation characteristics of the flame of the burning fuel.

It is an object of the present invention to provide an improved process for the production of metal or metalloid oxides, whereby heat may be supplied to the reaction zone, and ancillary advantages obtained.

Accordingly, the present invention is a process for the production of metal or metalloid oxides by the oxidation in the vapour phase of a metal or metalloid halide with an oxygenating gas, characterised by the introduction into the reaction zone of a gas which has been heated by passage through an electric arc or induction heater.

The process of this invention is of particular value in the production of finely-divided titanium dioxide by the oxidation of a titanium tetrahalide (such as titanium tetrachloride) with oxygen or other oxygenating gas. It is also of value in the production of silica, zirconia or alumina by the oxidation of the appropriate metalloid or metal halide; important examples are the oxidation of silicon tetrachloride or zirconium tetrachloride, to produce silica or zirconia, respectively, and the oxidation of aluminum trichloride to produce alumina.

The preferred oxygenating gas in such processes is oxygen, although oxygen diluted with inert gas may also be used; thus, air or oxygen-enriched air is also particularly suitable.

The reaction zone may be an empty, i.e. unobstructed, zone of the type used with previously known burners for the production of metal oxides, for example titanium dioxide. Such reaction zones normally comprise a shaft furnace lined with a heat and halogen-resisting lining, for example a ceramic lining, and having means for withdrawing the oxide produced, for example titanium dioxide, from the reaction zone for recovery and further treatment as desired. Provision may also be made for the introduction of a cooling gas or liquid for the purpose of chilling rapidly the reaction products, for example to a temperature below about 700° C. This is often preferably accomplished by blowing in air or a halogen or recirculated tail gas into the base of the furnace countercurrent to the descending pigment and other reaction products.

The gas heated by passage through an electric arc or induction heater may be an inert gas, for example nitrogen or argon, although there is envisaged the use of some or all of one of the reactants, particularly a portion of the oxygenating gas.

In the case where an inert gas is used as the gas heated by the electric arc or induction heater, the reactants may be pre-mixed before introduction into the reaction zone, or they may be introduced separately. One may of course pre-heat one or both reactants to a temperature sufficient to prevent condensation of the halide.

A sufficient quantity of the gas heated by the arc is normally introduced into the reaction zone to maintain in this zone a temperature at which the oxidation of the metal or metalloid halide will take place to produce the metal or metalloid oxide in the desired form. The amount of the heated gas introduced will depend upon the heat losses from the reaction zone and upon the energy level of the gas, and the latter will in turn depend upon the nature of the gas, the rate at which the gas is passed through the arc or induction heater and the electrical energy input to the arc or induction heater. The higher the energy level of the gas, the smaller the volume of the gas which will be required to maintain the reaction temperature.

The preferred energy level to which the gas passing through the arc or induction heater should be raised for the purpose of maintaining a reaction temperature in the reaction zone should be an amount of at least 10 kcals. per mole of gas in excess of the heat content required to raise the temperature of the gas to 1000° C., and usually the theoretical gas temperature is in excess of 2000° C.

It is generally preferred to introduce the smallest convenient volume of the arc-heated gas since this reduces the dilution of the gaseous by-products of the oxidation reaction, for example chlorine.

Mean temperatures in the reaction zone of at least 800° C. are normally required and temperatures in the range of 950° C. to 1600° C. are normally preferred, although the most preferable mean temperature will of course depend on the nature of the reactants. In the case of the oxidation of a titanium tetrahalide, for example titanium tetrachloride, a mean reaction temperature in the range of 950° C. to 1100° C. is preferred; in the case of the oxidation of a silicon tetrahalide, such as silicon tetrachloride, a mean reaction temperature in the range of 1050° C. to 1150° C. is preferred.

In addition or as an alternative to the introduction of the heated gas to maintain the desired reaction temperature, the heated gas may also be introduced into the reaction zone for other purposes. For example, it may be used to introduce nuclei into a reaction zone which is already maintained at a suitable temperature. The nuclei may be formed by vapourisation of a vapourisable element or compound, for example metal or metalloid oxide. When the process is for the production of titanium dioxide, these nuclei may be formed, for example, by vapourising titanium dioxide in the hot gas and by carrying the titanium dioxide vapour thus formed into the reaction zone in the heated gas. The titanium dioxide may then recondense in the reaction zone to form nuclei. It is also possible that ions or activated particles existing in the arc-heated gas after passage through the electric arc or induction heater may themselves serve as nuclei, and under these circumstances it may be unnecessary to introduce a vapourised element or compound with the heated gas.

The reactants (or reactant or portion of the reactants) which are not heated by passage through the electric arc or induction heater are preferably pre-heated to a relatively low temperature before introduction into the reaction zone, for example to a temperature in the range of 50° C. to 400° C. These gases may be pre-heated by known means by heat exchange with cooling medium from the electric arc or induction heater. It is, of course, desirable that the reactants be not pre-heated to such a temperature that they react, if premixed, before introduction into the reaction zone; consequently they are preferably pre-heated to a temperature no higher than about 50–100° C. below the temperature at which they react.

The preferred device for heating gas by passage through an electric arc comprises electrodes between which an electric arc is passed while the gas is passed through the space in which the arm forms and thus takes part in the formation and stabilisation of the arc. In order to achieve the best results for the transfer of energy from the arc to the gas and to stabilize the arc, it has been found desirable that the gas passed through the space between the electrodes should either follow a helical path or form a laminar flow, since these forms of gas flow are believed to be the most efficient for this purpose.

The gas passing through the arc or induction heater is raised to so high a temperature, that a large amount of energy can be introduced into the reaction zone in a comparatively small volume of gas. It is thus possible to avoid the use of large and complicated burners.

When heating the gas by an induction heater the inert gas or part or all of one of the reactants may be heated to a high temperature by passage through a device without permanent electrodes in which the gas is passed through a conduit into which an electrical discharge is introduced by means of a radio-frequency generator coupled to a coil around the walls of the conduit.

When such induction heater is used, the radio frequency generator preferably operates at a frequency in the range 1 to 10 megacycles per second and the voltage applied to the coil should preferably be in excess of 5,000 volts. The coil preferably consists of water cooled copper tubing, so that the radio frequency generator is coupled to the coil of copper tubing and water is passed through the coil. It appears that it may be possible to stabilise the plasma by the methods described above for the electric arc, namely by introducing the gas tangentially to form a helix or by laminar flow.

The coil may be in one plane, or the coil may be formed so that the copper tube or wire is coiled upon itself, thus forming a spiral rather than a helix. Such a design is believed to produce plasma which is "equally stable and more easily visible."

In view of the temperature generated in the device it is normally necessary to cool the electrodes of the electric arc or the wall of the conduit of the induction heater. This may conveniently be done by circulating a liquid cooling medium of high boiling point, for example Dowtherm (registered trademark) or water, so as to be in effective heat exchange contact with the electrodes or wall of the conduit. The heated cooling medium may then be subjected to heat exchange contact with the incoming reactant or reactants which are not heated by passage through the arc or induction heater, so as to preheat them to the moderate degree described above.

In addition to the oxygenating gas, the metal or metalloid halide and any additional inert heated gas, other substances may be introduced into the reaction zone. For example, in the production of titanium dioxide, rutilising agents such as aluminum halides, zirconium tetrahalides and/or water vapour may be introduced, with or without other titanium dioxide crystal-modifying agents such as silicon tetrahalide, phosphorus halide (for example phosphorus trichloride), antimony halide (for example antimony pentachloride), an alkali metal compounds, or an alkaline earth metal compound. These additions may be made to the reactants before introduction into the reaction zone or they may be added separately, for example by injection into the hot gas. Suitable proportions of these additives may usually be in the range of about 0.01% to about 10%, by weight of titanium dioxide produced, depending upon the particular additive used. The following are examples of additives and the amounts of them which are generally suitable:

Aluminum halides—0.1 to 10%, preferably 0.5 to 5% (estimated as alumina).
Zirconium tetrahalides—0.1 to 10%, preferably 0.5 to 5% (estimated as zirconia).
Silicon tetrahalides—0.01 to 5%, preferably 0.05 to 2% (estimated as silica).
Phosphorous halides or antimony halides—0.01 to 5%, preferably 0.05 to 2% (estimated as $P_2O_5$).
Alkalimetal compounds or alkaline earth metal compounds—0.0001 to 5%, preferably 0.001 to 1%.

As previously noted, nucleating agents may also be added to the reaction zone by the injection of an element or compound such as titanium dioxide, alumina or silica into the hot gas, wherein the solid is vapourised the vapourised solid then forming in the reaction zone particles of the appropriate size for nucleation. It may also be possible, as previously indicated, to form nuclei in the reaction zone without the necessity of vapourising an element or compound in the electric arc or induction heater, thereby simplifying the process considerably.

Figure 2:
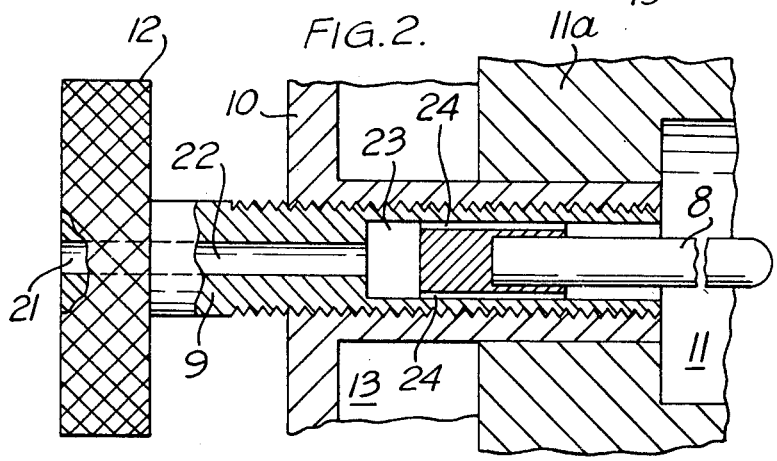
Figure 3:
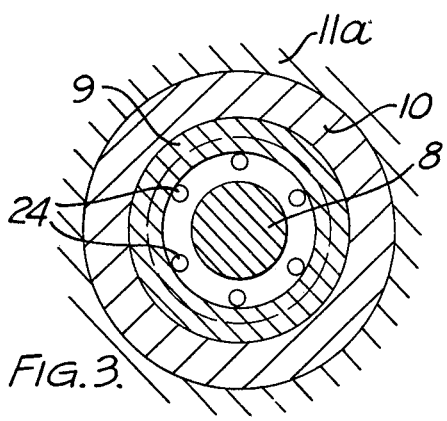

In the drawings, FIG. 1 shows, partly in section, a device comprising an electric arc for heating the gas. FIG. 2 shows a modified form of part of the device of FIG. 1. FIG. 3 shows a section through 3—3 of FIG. 2.

In FIG. 1 an annular slot 1 is formed between discs 2 of refractory material or cooled metal fixed to a flat face 3 of an electrode 4 having a passage 5 through its centre in a direction perpendicular to the flat face 3. Surrounding the electrode 4 is an annular channel 6, for the passage of a coolant which is eventually withdrawn through outlet 7. An arc (not shown) is struck on the sides of passage 5 from a thoriated tungsten electrode 8 which is fixed to screwed rod 9 operating in a thread in a back plate 10, and which projects into chamber 11 (formed in impermeable insulating material 11a) from which leads passage 5. Forward and backward movement of the electrode 8 is obtained by rotating the knurled knob 12 attached to the screwed rod 9.

The back plate 10 encloses another annular cooling channel 13 through which coolant is circulated to remove heat transmitted from the electrode 8 to the screwed rod 9. Coolant for the device is pumped into inlet 14 and circulates through channel 6 and is then led through pipe 15 to channel 13 where it circulates around electrode 9 before being withdrawn through outlet 7, as previously described.

The gas to be heated by the arc is injected into the device through inlet pipe 16 and it emerges from this pipe tangentially to the wall of the chamber 11 through orifice 17; a helical motion is thus imparted to the gas which retains it while passing through passage 5 and out of the device through orifice 18.

When a suitable power source (which may be AC or DC but is preferably DC) is connected to the electrodes 4 and 8 an arc is struck which is stabilised by the helical motion of the gas passing through passage 5, and the gas is rapidly raised to a high temperature. The gas is then ejected with high velocity from orifice 18.

The reactants, for example a titanium tetrahalide/oxygen/aluminum halide mixture are introduced into the annular slot 1 through inlet pipe 19.

If it is desired to introduce materials into the electric arc to be vapourised, for example a solid to provide nuclei, this may conveniently be done by introducing such solid through passage 20.

Instead of being admitted through inlet pipe 16 and orifice 17, the gas to be heated by the arc may be passed longitudinally through a bore or bores in the screwed rod 9. Part of an apparatus comprising such a feature is shown in FIG. 2 and FIG. 3 (the latter being a section through 3—3 of FIG. 2).

In FIG. 2 and FIG. 3, the screwed rod 9 has an orifice 21 in the knurled knob 12, leading to a bore 22 which itself leads to a chamber 23. From the chamber, a number of bores 24 lead to the chamber 11, these bores being parallel to the thoriated tungsten electrode 8.

When the device of FIG. 2 and FIG. 3 is being used, the gas to be heated is admitted through the orifice 21 and passed through bore 22, chamber 23 and bores 24 to flow past the electrode 8 into chamber 11.

The invention is illustrated by the following examples. Where gas flow rates are mentioned in these examples they are measured at N.T.P.

Example 1

A compact device of the type described above and shown in FIG. 1 was used. It was 3½ inches in length and 2½ inches in diameter.

The device was downwardly mounted at the upper end of a vertical silica tube 6" in internal diameter and 3 ft. in length. From the lower end of this tube a lead off was taken to two aspirators, each of 10 litres capacity connected in series. The outlet of the second aspirator was connected to a scrubbing unit and pump.

The electrodes of the device were then connected to the negative and positive terminals of a direct current power source. Cooling water was pumped around the electrodes in the manner described above.

Argon was admitted to the device through inlet 16 at a pressure of 100 lbs./sq. in. and at a flow rate of 5 litres/min. An arc was then struck between the electrodes 4 and 8, the requirement of the arc being 215 amps at an E.M.F. of 24.5 volts. The argon became visible as a highly heated jet of gas having an energy content of about 22 kcals. per mole.

A pre-mixed feed of titanium tetrachloride, oxygen and aluminum chloride, pre-heated to a temperature of 250° C., was passed through inlet pipe 19 into annular slot 1. The feed comprised 1 mole/min. titanium tetrachloride, 36 litres/min. oxygen, and sufficient aluminum chloride to give 3.4% by weight of alumina (based on the weight of titanium dioxide produced).

The oxidation reaction took place in the vertical silica tube. The effluent gases were drawn through the aspirators. The titanium dioxide product was collected partly at the base of the vertical silica tube and partly in the aspirators.

The reaction proceeded smoothly and the titanium tetrachloride was converted substantially quantitatively to pigmentary titanium dioxide. Samples were removed for the estimation of tinting strength and rutile content.

The tinting strength of the product was excellent at 1550 (on the Reynolds scale) and the rutile content of the product was 97.7%, by weight.

Examples 2–7

A device was used as described above and shown in FIG. 1, except that instead of having a single annular slot 1, it had three successive annular slots formed between successive discs coaxial with discs 2. Each slot was one-sixteenth inch wide. The first slot was half an inch from the flat face 3; the second slot was half an inch from the first slot; and the third slot was one and five-sixteenths inches from the second slot.

The electrodes of the device were connected to the terminals of a direct current power source. Cooling water was pumped around the electrodes in the manner described above.

Argon was admitted to the device through inlet 16 at a rate of 25 litres/min. An arc was then struck between the electrodes 4 and 8, the requirement of the arc being 250 amps and 21/22 volts.

The reactants and the amounts thereof introduced through the various slots in these Examples 2–7 are shown in Table I. This table also shows the tinting strength on the Reynolds scale of the final product, as well as the rutile content. The mean weight particle size is shown where measured (the mean weight particle size being of course the particle size at which equal weights of the particles have sizes above and below the specified value).

The percentages of alumina and silica indicated in the various examples are by weight of the titanium dioxide produced from the titanium tetrachloride introduced in the first two slots except in the case of Example 6 where the percentage of alumina is by weight of the titanium dioxide produced from the titanium tetrachloride injected through slot 1. The alumina and silica were not introduced as such, but were introduced as the corresponding chlorides.

TABLE I

| Ex. | Slot 1 | Slot 2 | Slot 3 | Tinting strength (Reynolds Scale) | Rutile content of product, percent | Mean weight particle size (micron) |
|---|---|---|---|---|---|---|
| 2 | 1.5 moles/min. O₂+2% Al₂O₃ | 1 mole/min. TiCl₄ vapour+0.5% SiO₂. | | 1,675 | 98.9 | |
| 3 | 0.75 mole/min. O₂+3% Al₂O₃ | 0.5 mole/min. TiCl₄ vapour+0.5% SiO₂. | | 1,785 | 98.1 | 0.21 |
| 4 | 0.7 mole/min. O₂ | 0.5 mole/min. TiCl₄ vapour+0.4% SiO₂+3% Al₂O₃. | | 1,730 | 96.9 | 0.23 |
| 5 | 0.75 mole/min. O₂+2% Al₂O₃ | 0.5 mole/min. TiCl₄ vapour+0.25% SiO₂. | 1.5 moles/min. O₂+TiCl₄ 1 mole/min. (premixed). | 1,630 | 96.1 | |
| 6 | 0.75 mole/min. O₂+0.5 mole/min. TiCl₄+6% Al₂O₃ (premixed)+0.25% SiO₂ (premixed). | 0.75 mole/min. O₂+0.5 mole/min. TiCl₄. | 0.75 mole/min. O₂+0.5 TiCl₄ mole/min. (premixed). | 1,730 | 96.9 | |
| 7 | 0.75 mole/min. O₂+2% Al₂O₃ | 0.5 mole/min. TiCl₄+0.25% SiO₂ | 1.5 mole/min. O₂+1 mole/min. TiCl₄ (premixed). | 1,630 | 96.1 | |

Examples 8–10

For Examples 8–10, the device of Examples 2–7 was used, except that it was modified as shown in FIG. 2 and FIG. 3. In Example 8, the gas to be heated was introduced entirely through the bores 24 of FIG. 2 and FIG. 3, whereas in Examples 9 and 10 part of this gas (argon) was introduced in this way and part (nitrogen) was introduced through inlet pipe 16 and orifice 17 of FIG. 1 as in the case of Examples 1–7. The introduction of the gas through bores 24 was intended to stabilise the electric arc by laminar gas flow, as opposed to stabilisation by vortex formation by introduction through orifice 17. The method of Examples 9 and 10 was intended to achieve a mixed laminar/vortex stabilisation.

Table II shows details of Examples 8–10, in a manner analogous to that in which Table I showed details of Examples 2–7. Only the first two slots of the device used for Examples 2–7 were used for Examples 8–10.

In Example 8, the gas to be heated (argon) was introduced through bores 24 at a rate of 30 litres/min. The requirement of the arc was 250 amps and 20 volts.

In Example 9, part of the gas to be heated (argon) was introduced through bores 24 at a rate of 28 litres/min., and the remainder (nitrogen) was introduced through orifice 17 at a rate of 10 litres/min. The requirement of the arc was 250 amps and 40 volts.

In Example 10, part of the gas to be heated (nitrogen) was introduced through bores 24 at a rate of 8 litres/min., and the remainder (argon) was introduced through orifice 17 at a rate of 8 litres/min. The requirement of the arc was 250 amps and 34 volts.

TABLE II

| Slot 1 | Slot 2 | Tinting strength (Reynolds Scale) | Rutile content, percent |
|---|---|---|---|
| 0.75 mole/min. O₂ | 0.5 moles/min. TiCl₄ | 1,460 | 58 |
| 1.5 mole/min. O₂ | 1 mole/min. TiCl₄+3% Al₂O₃. | 1,675 | 98 |
| 1.5 mole/min. O₂ | 1 mole/min. TiCl₄ | 1,460 | 58 |

Example 11

This example was carried out precisely as Example 2, except that the amount of silica was 0.3% instead of 0.5%, the rate of flow of the argon through pipe 16 and orifice 17 was 20 litres/min. instead of 25 litres/min., the requirement of the arc was 250 amps and 24 volts instead of 250 amps and 21/22 volts, and a small amount of water was introduced through passage 20 (FIG. 1). The amount of water was 2%, by weight of the titanium dioxide produced The resulting titanium dioxide had a tinting strength of 1660 on the Reynolds scale, a rutile content of 98.2%, and a mean weight particle size of 0.14 micron.

Example 12

The purpose of this example was to produce very small particles suitable for use as nucleating agents from preformed titanium dioxide powder.

The example was carried out in a manner similar to that of Example 11, except that nothing was introduced through the slots and no water was introduced through passage 20. Instead, a further 20 litres/min. of argon were introduced through passage 20, carrying in suspension 4 grams/min. of pigmentary titanium dioxide of particle size about 0.3 micron.

The mean weight particle size of the product was 0.02 micron.

Example 13

The device was as described in Example 2, except that it had two annular slots.

*No. 1 slot.*—0.75 mole/min. oxygen. This comprised 9 litres/min. of oxygen through a preheater to raise the temperature of the gas to 150° C. and 9 litres/min. of oxygen passed over a potassium chloride "smoke" generator. The latter comprised molten potassium chloride heated to 1050° C. and the oxygen was passed over the surface of this melt. Sufficient potassium chloride was entrained in the oxygen to give 0.1% by weight on the titanium dioxide produced. The oxygen stream also contained sufficient aluminum trichloride to produce 2% by weight of alumina on the titanium dioxide.

*No. 2 slot.*—0.5 mole/min. of titanium tetrachloride preheated to about 150° C. containing sufficient silicon tetrachloride to give 0.25% by weight of silica on TiO₂.

The product had a tinting strength of 1710 (on the Reynold's scale) and had a mean weight particle size of 0.23 micron. The rutile content of the product was 95%.

What is claimed is:

1. In a process for the production of normally solid, particulate metal oxide wherein the corresponding metal halide is oxidized in the vapor phase to form said metal oxide, the improvement which comprises effecting said vapor phase oxidation by the steps of:
   (a) subjecting to electrical discharge gas selected from the group consisting of
      (i) inert gas,
      (ii) vaporized, oxidizable metal halide, and
      (iii) oxygenating gas,
   whereby electrical energy from said electrical discharge is converted to heat energy in said gas to heat said gas to a temperature above about 2000° C.;
   (b) introducing said heated gas into a reaction zone;
   (c) introducing into said reaction zone reactants comprising
      (i) vaporized metal halide and
      (ii) oxygenating gas,
   the combined amounts of vaporized metal halide and oxygenating gas introduced into said reaction zone by steps (b) and (c) being in relative proportions for the substantially quantitative conversion of said metal halide to the corresponding oxide;
   (d) intimately mixing said heated gas and said reactants in said reaction zone whereby said reactants are heated to a mean temperature in the range of about 800° C. to about 2000° C. and said oxidation of said metal halide is effected to provide a gaseous suspension of solid, particulate metal oxide dispersed in a gaseous effluent comprising by-product halogen;
(e) withdrawing said gaseous suspension from said reaction zone; and
(f) separating dispersed solids from said gaseous suspension to provide a solid product comprising particulate metal oxide and a halogen-rich, gaseous product.

2. A process in accordance with claim 1 wherein said electric discharge is an electric arc between electrodes and said gas is heated by passage through said arc between said electrodes.

3. A process in accordance with claim 2 wherein said gas is heated to a heat energy content of at least 10 kilocalories per mol of said gas in excess of the heat content theoretically required to raise the temperature of the gas to 1000° C. and wherein the thus heated gas is passed substantially immediately into said reaction zone in an amount and at a temperature sufficient to maintain in said reaction zone a mean temperature in the range of about 950° C. to 1600° C.

4. A process in accordance with claim 3 wherein said heated gas is selected from the group consisting of nitrogen, argon, individual reactants and mixtures of the foregoing in which only one reactant is present.

5. A process in accordance with claim 4 wherein said heated gas is at least a portion of the oxidizing gas.

6. A process in accordance with claim 3 wherein said heated gas is passed into said reaction zone along a helical path.

7. A process in accordance with claim 3 wherein said heated gas is introduced into said reaction zone with laminar flow.

8. A process in accordance with claim 1 wherein said electric discharge is radio frequency induced.

9. A process in accordance with claim 8 wherein said gas is heated to a heat energy content of at least 10 kilocalories per mol of said gas in excess of the heat content theoretically required to raise the temperature of the gas to 1000° C. and wherein the thus heated gas is passed substantially immediately into said reaction zone in an amount and at a temperature sufficient to maintain in said reaction zone a mean temperature in the range of about 950° C. to 1600° C.

10. A process in accordance with claim 9 wherein said heated gas is selected from the group consisting of nitrogen, argon, individual reactants and mixtures of the foregoing in which only one reactant is present.

11. A process in accordance with claim 10 wherein said heated gas is at least a portion of the oxidizing gas.

12. A process in accordance with claim 9 wherein said heated gas is passed into said reaction zone along a helical path.

13. A process in accordance with claim 9 wherein said heated gas is introduced into said reaction zone with laminar flow.

14. A process in accordance with claim 1 wherein at least one member selected from the group consisting of aluminum halides, zirconium tetrahalides, water, silicon tetrahalides, phosphorous halides, antimony halides, alkali metal compounds, alkaline earth metal compounds, titanium dioxide, alumina and silica is introduced into the stream of gas which is heated by said electric discharge and is carried by the heated gas in vaporous form into said reaction zone.

15. A process in accordance with claim 1 wherein said heated gas is passed substantially immediately from the electric discharge zone into the reaction zone.

16. A process in accordance with claim 1 wherein said heated gas is an inert gas.

17. A process in accordance with claim 1 wherein said heated gas is at least a portion of one of the reactants.

18. A process in accordance with claim 7 wherein the reactant that serves as the heated gas is the oxidizing gas.

19. A process in accordance with claim 1 wherein the heated gas entering the reaction zone has a heat energy content of at least 10 kilocalories per mol of gas in excess of the heat content theoretically required to raise the temperature of the gas to 1000° C.

20. A process in accordance with claim 1 wherein the heated gas is passed immediately from the electric discharge zone into the reaction zone along a helical path.

21. A process in accordance with claim 1 in which the heated gas is passed from the electric discharge zone into the reaction zone with laminar flow.

22. A process in accordance with claim 1 wherein said zone is maintained at a mean temperature in the range of 950 to 1600° C.

23. A process in accordance with claim 1 wherein said heated gas carries into the reaction zone nuclei of another substance.

24. A process in accordance with claim 23 wherein said heated gas carries vaporized metal oxide into the reaction zone.

25. A process in accordance with claim 1 wherein reactants are introduced into said reaction zone in step (c) at a temperature below about 400° C.

References Cited

UNITED STATES PATENTS

| | | |
|---|---|---|
| 2,240,343 | 4/1941 | Muskat. |
| 2,347,496 | 4/1944 | Muskat et al. |
| 2,798,819 | 7/1957 | Schaumann. |
| 3,051,639 | 8/1962 | Anderson _____ 204—164 X |
| 3,069,282 | 12/1962 | Allen. |

HERBERT T. CARTER, Primary Examiner

U.S. Cl. X.R.

23—139, 140, 142, 182, 202; 204—164